(12) United States Patent
Bishop et al.

(10) Patent No.: US 12,527,345 B2
(45) Date of Patent: Jan. 20, 2026

(54) CONSUMABLE WITH A DRYING AGENT FOR AN AEROSOL PROVISION SYSTEM AND THE AEROSOL PROVISION SYSTEM THEREFOR

(71) Applicant: Nicoventures Trading Limited, London (GB)

(72) Inventors: David Bishop, London (GB); Dominic Conrad Woodcock, London (GB); Ugurhan Yilmaz, London (GB)

(73) Assignee: Nicoventures Trading Limited, London (GB)

( * ) Notice: Subject to any disclaimer, the term of this patent is extended or adjusted under 35 U.S.C. 154(b) by 516 days.

(21) Appl. No.: 17/603,265

(22) PCT Filed: Apr. 9, 2020

(86) PCT No.: PCT/GB2020/050921
§ 371 (c)(1),
(2) Date: Oct. 12, 2021

(87) PCT Pub. No.: WO2020/208355
PCT Pub. Date: Oct. 15, 2020

(65) Prior Publication Data
US 2022/0183343 A1    Jun. 16, 2022

(30) Foreign Application Priority Data

Apr. 12, 2019    (GB) .................................... 1905233

(51) Int. Cl.
*A24B 15/167*    (2020.01)
*A24B 13/02*    (2006.01)
(Continued)

(52) U.S. Cl.
CPC ............ *A24B 15/167* (2016.11); *A24B 13/02* (2013.01); *A24B 15/16* (2013.01); *A24B 15/18* (2013.01);
(Continued)

(58) Field of Classification Search
CPC ....... A24B 15/167; A24B 13/02; A24B 15/16; A24B 15/18; A24B 15/287; A24B 15/12;
(Continued)

(56) References Cited

U.S. PATENT DOCUMENTS

2014/0260985 A1    9/2014    Akdogan
2017/0245543 A1    8/2017    Karles
(Continued)

FOREIGN PATENT DOCUMENTS

| CN | 102325472 A | 1/2012 |
| CN | 107497412 A | 12/2017 |

(Continued)

OTHER PUBLICATIONS

International Search Report and Written Opinion for International Application No. PCT/GB2020/050921, dated Jun. 29, 2020, 14 pages.
(Continued)

*Primary Examiner* — Justin M Kratt
(74) *Attorney, Agent, or Firm* — Merchant & Gould P.C.

(57) ABSTRACT

A consumable for an aerosol provision system comprising at least one substrate material in proximity to at least one drying agent. The drying agent preferably includes a sorbent, e.g., a desiccant, a wicking material or a mixture thereof. Also provided is a pod for an aerosol provision system where the pod contains the consumable and the consumable is configured to receive an aerosol, and use of
(Continued)

a drying agent to increase consistency or yield of volatile compound delivery from a substrate material in an aerosol provision system.

20 Claims, 5 Drawing Sheets

(51) Int. Cl.
*A24B 15/16* (2020.01)
*A24B 15/18* (2006.01)
*A24B 15/28* (2006.01)
*A24F 40/42* (2020.01)
*A24F 40/44* (2020.01)
*A24B 15/10* (2006.01)
*A24B 15/12* (2006.01)
*A24F 40/10* (2020.01)
*A24F 40/20* (2020.01)
*A24F 40/30* (2020.01)
*A24F 40/40* (2020.01)
*A24F 40/485* (2020.01)

(52) U.S. Cl.
CPC ............ *A24B 15/287* (2013.01); *A24F 40/42* (2020.01); *A24F 40/44* (2020.01); *A24B 15/10* (2013.01); *A24B 15/12* (2013.01); *A24B 15/183* (2013.01); *A24B 15/28* (2013.01); *A24F 40/10* (2020.01); *A24F 40/20* (2020.01); *A24F 40/30* (2020.01); *A24F 40/40* (2020.01); *A24F 40/485* (2020.01)

(58) Field of Classification Search
CPC ....... A24B 15/183; A24B 15/28; A24B 15/10; A24F 40/42; A24F 40/44; A24F 40/10; A24F 40/20; A24F 40/30; A24F 40/40; A24F 40/485
See application file for complete search history.

(56) References Cited

U.S. PATENT DOCUMENTS

2018/0007951 A1* 1/2018 Karles ...................... B01J 20/20
2018/0092400 A1    4/2018 Sahin et al.

FOREIGN PATENT DOCUMENTS

| | | |
|---|---|---|
| EP | 3042577 A1 | 7/2016 |
| EP | 3 180 060 A1 | 6/2017 |
| EP | 3 409 597 A1 | 12/2018 |
| JP | 2017528153 A | 9/2017 |
| JP | 2018534908 A | 11/2018 |
| JP | 2019507592 A | 3/2019 |
| RU | 2684452 C2 | 4/2019 |
| WO | 2010080599 A1 | 7/2010 |
| WO | 2015046385 A1 | 4/2015 |
| WO | WO 2016/024083 | 2/2016 |
| WO | WO 2016/046362 A1 | 3/2016 |
| WO | 2017179043 A1 | 10/2017 |
| WO | WO 2018/007936 A2 | 1/2018 |
| WO | WO 2018/114261 A1 | 6/2018 |

OTHER PUBLICATIONS

"International Preliminary Report on Patentability received for PCT Patent Application No. PCT/GB2020/050921, Oct. 21, 2021", 8 pages.
"Office Action Received for Japanese Patent Application No. 2021-559749, mailed on Mar. 7, 2023", 10 pages (5 pages of English Translation and 5 pages of Official Copy Only).
"Office Action Received for Russian Patent Application No. 2021132862, mailed on Jul. 7, 2022", 10 pages (Only Official Copy).

* cited by examiner

CONSUMABLE WITH A DRYING AGENT FOR AN AEROSOL PROVISION SYSTEM AND THE AEROSOL PROVISION SYSTEM THEREFOR

CROSS-REFERENCE TO RELATED APPLICATIONS

This application is a National Phase entry of PCT Application No. PCT/GB2020/050921, filed Apr. 9, 2020, which application claims the benefit of priority to GB 1905233.1 filed Apr. 12, 2019, the entire disclosures of which are incorporated herein by reference.

FIELD

The present disclosure relates to a consumable for an aerosol provision system which includes at least one drying agent. In addition, the present disclosure relates to the use of a drying agent in an aerosol provision system, and a method of operating an aerosol provision system which includes the consumable.

BACKGROUND

Electronic aerosol provision systems such as electronic cigarettes (e-cigarettes) generally contain a cartomizer with a reservoir of a liquid formulation, or a substrate material such as a tobacco-based product, from which vapour or aerosol is generated for inhalation by a user, for example through heat vaporisation. Generally nicotine and often flavorants or flavor agents are present in the liquid of the reservoir or the substrate material. In some countries, local regulations or other reasons (e.g. sensory issues) mean that nicotine can only be present in the substrate material.

Thus, an aerosol provision system will typically comprise a cartomizer with an aerosol or vapour generating element, e.g. a heater, arranged to vaporise a portion of precursor material to generate aerosol in an aerosol generation chamber. As a user inhales on the system or device and electrical power is supplied to the heater, air is drawn into the device through inlet holes and into the aerosol generation chamber where the air mixes with the vaporised precursor material. There is then typically a flow path connecting the aerosol generation chamber and an opening in the mouthpiece of the device, so that incoming air drawn through the aerosol generation chamber continues along the flow path, carrying at least some of the aerosol with it and out through the mouthpiece opening for inhalation by the user.

When a substrate material is present, the flow path connecting the aerosol generation chamber and an opening in the mouthpiece of the device will generally proceed via the substrate material. The substrate material can be heated by the aerosol or vapour generating element used to vaporise a portion of precursor material or the aerosol itself, so as to extract nicotine into the aerosol inhaled by the user.

Aerosol provision systems may comprise a modular assembly including both reusable and replaceable components. Typically an aerosol provision system includes a cartridge or cartomizer containing the aerosol precursor material or the aerosol generating element, and a reusable device part which comprises longer-life items, such as a rechargeable battery, device control circuitry, activation sensors or user interface features. The reusable part may also be referred to as a control unit or battery section, and replaceable cartridges that include both an aerosol generating element and a precursor material may be referred to as cartomizers.

Cartridges or cartomizers are electrically and mechanically coupled to a control unit for use, for example, using a screw thread or bayonet fixing with appropriately engaging contacts. When the aerosol precursor material in a cartridge or cartomizer is exhausted, or the user wishes to switch to a different cartridge or cartomizer having a different aerosol precursor material, a cartridge/cartomizer may be removed from the control unit and a replacement cartridge/cartomizer attached in its place. Alternatively, the removed cartridge/cartomizer may be refilled before reattachment to the control unit.

SUMMARY

In accordance with some embodiments described herein, there is provided a consumable for an aerosol provision system, comprising at least one substrate material in proximity to at least one drying agent. The term "consumable" is used herein to refer to an article, part or all of which is intended to be consumed by a user.

The at least one drying agent may include a sorbent. The sorbent may be a desiccant, a wicking material, or a mixture thereof. When the sorbent is a desiccant or mixture thereof, it may be selected from the group consisting of an anhydrous inorganic salt, a superabsorbent polymer (SAP), silica, or a mixture thereof. It may further be selected from the group consisting of silica, sodium polyacrylate, anhydrous calcium chloride, anhydrous sodium sulfate, anhydrous calcium sulfate, anhydrous magnesium sulfate and mixtures thereof.

The drying agent(s) and the substrate material(s) may be independent of one another and in the form of a mixture. Alternatively, the drying agent(s) and substrate material(s) may be contained in the same particulate form, e.g. contained within the same granule, particle or the like. As a further alternative, the drying agent(s) may be arranged to be at least partially in contact with a surface of the consumable and adjacent to the substrate material(s). In one embodiment the drying(s) agent may be arranged to at least partially surround the substrate material(s).

Also provided is a pod for an aerosol provision system, wherein the pod contains the consumable as defined herein, wherein the consumable is configured to receive an aerosol, and wherein the at least one substrate material includes a substrate material. The substrate material may be a tobacco substrate material.

In addition there is provided a cartomizer for generating aerosol upstream of the consumable as defined herein or the pod as defined herein. The cartomizer may comprise an aerosol generation chamber containing at least one aerosol precursor material and at least one component for generating aerosol from the at least one aerosol precursor material, wherein the aerosol generation chamber and the consumable or the pod are arranged in fluid communication so that when the cartomizer is comprised in an aerosol provision system and suction is applied by a user to an outlet of the aerosol provision system, an aerosol flow path is established from the aerosol generation chamber, via the consumable or the pod, to the outlet; wherein the aerosol generation chamber does not include a drying agent.

Also provided is an aerosol provision system comprising the consumable as defined herein, or the pod as defined herein.

Also provided is an aerosol provision system comprising the cartomizer as defined herein.

Also provided is the use of a drying agent to increase consistency or yield of volatile compound(s) delivery from a substrate material in an aerosol provision system. This use may involve the aerosol provision system which comprises the consumable as defined herein, or the pod as defined herein.

Finally there is provided a method of operating an aerosol provision system configured to increase consistency or yield of volatile compound(s) delivery from a substrate material(s). The method comprises generating an aerosol from at least one aerosol precursor material, and passing the aerosol through a consumable containing at least one substrate material in proximity to at least one drying agent, wherein the drying agent(s) and substrate material(s) are independent of one another and in the form of a mixture, or wherein the substrate material(s) and drying agent(s) are contained in the same particulate form, or wherein the drying agent(s) is arranged to at least partially surround the substrate material(s), or wherein the substrate material(s) is arranged to at least partially surround the drying agent(s).

These embodiments are set out in the appended independent and dependent claims. It will be appreciated that features of the dependent claims may be combined with each other and with features of the independent claims in combinations other than those explicitly set out in the claims.

Furthermore, the approaches described herein are not restricted to specific embodiments such as those set out below, but include and contemplate any combinations of features presented herein. For example, a consumable, pod, cartomizer or aerosol provision system may be provided in accordance with approaches described herein which includes any one or more of the various features described below as appropriate.

BRIEF DESCRIPTION OF THE DRAWINGS

Embodiments of the disclosure will now be described, by way of example only, with reference to the accompanying drawings, in which:

FIG. 1 shows drying agent 8 and substrate material 7 as a mixture in a consumable 6 in accordance with certain embodiments of the disclosure.

In FIG. 2, drying agent 8 and substrate material 7 are arranged in a consumable 6 according to certain embodiments of the disclosure independently of one another, with the drying agent on the inside surface (wall) of the consumable and the substrate material approximately in the centre. The drying agent at least partially surrounds the substrate material.

In FIG. 3, drying agent 8 and substrate material 7 are arranged independently of one another, with the drying agent forming an approximately central pillar, and the substrate material arranged towards the inside surface (wall) of the consumable. The substrate material at least partially surrounds the drying agent.

Figure 1:
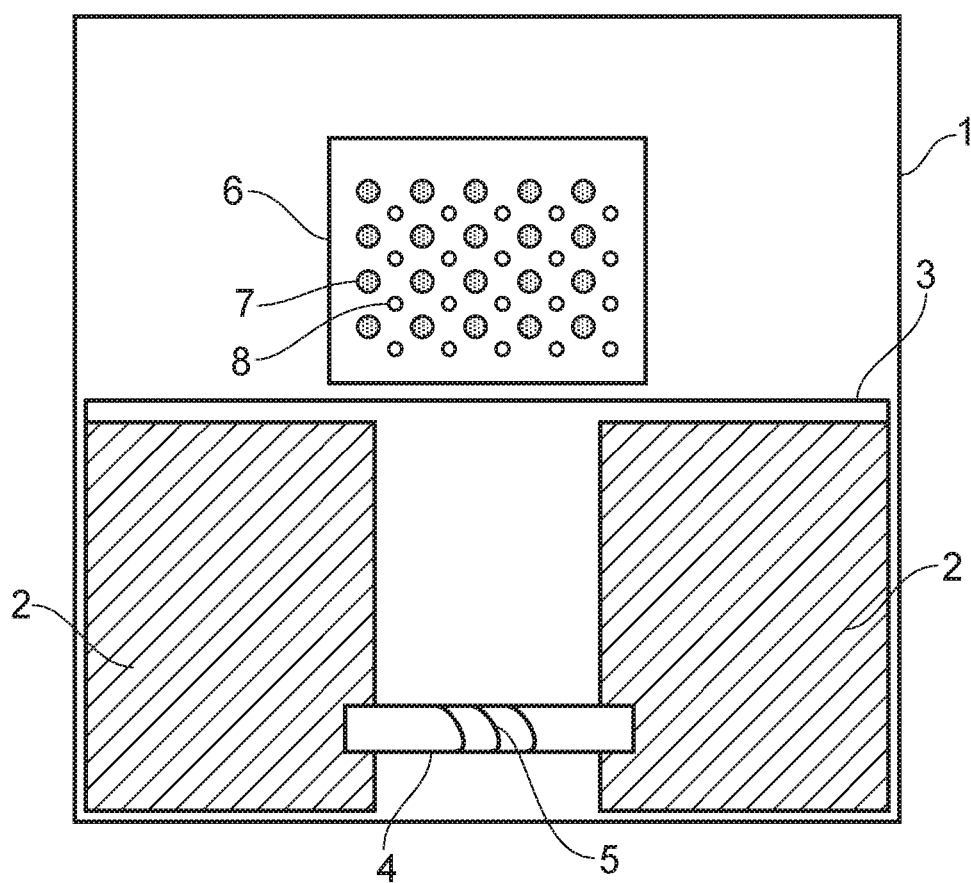
FIG. 1 is a highly schematic cross-section of a cartomizer 1 in accordance with certain embodiments of the disclosure. As is discussed in more detail below.
Figure 2:
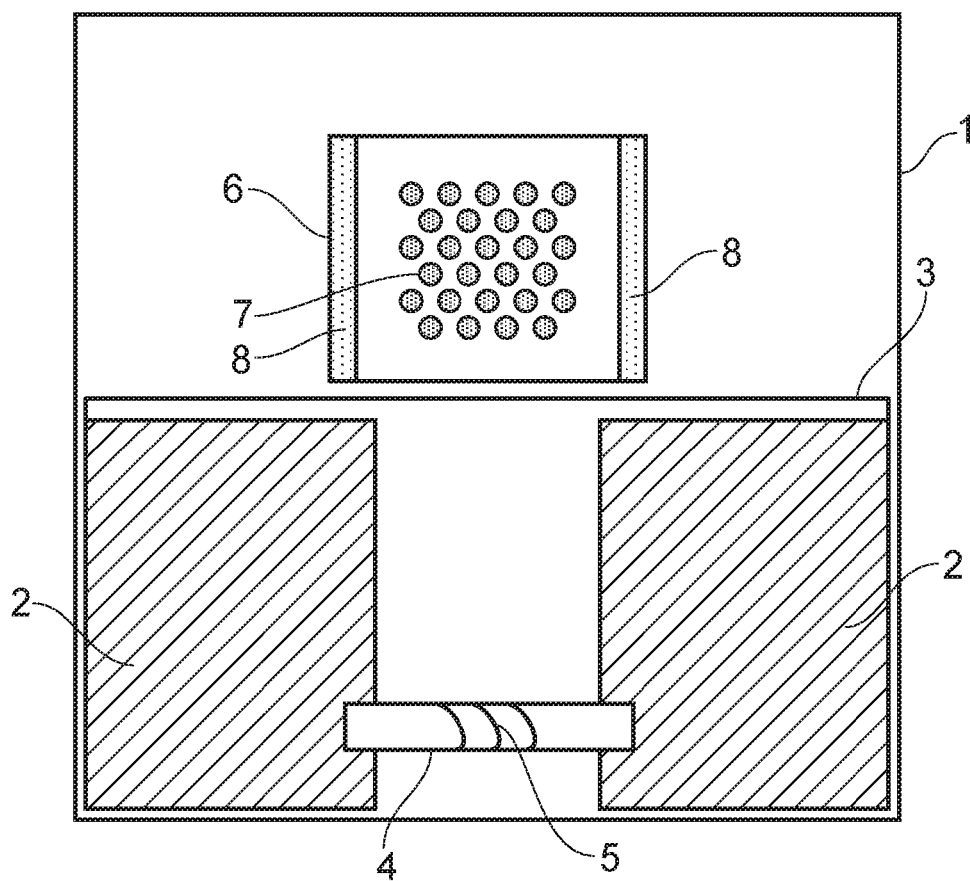
FIG. 2 is a highly schematic cross-section of a cartomizer 1 in accordance with certain embodiments of the disclosure.
Figure 3:
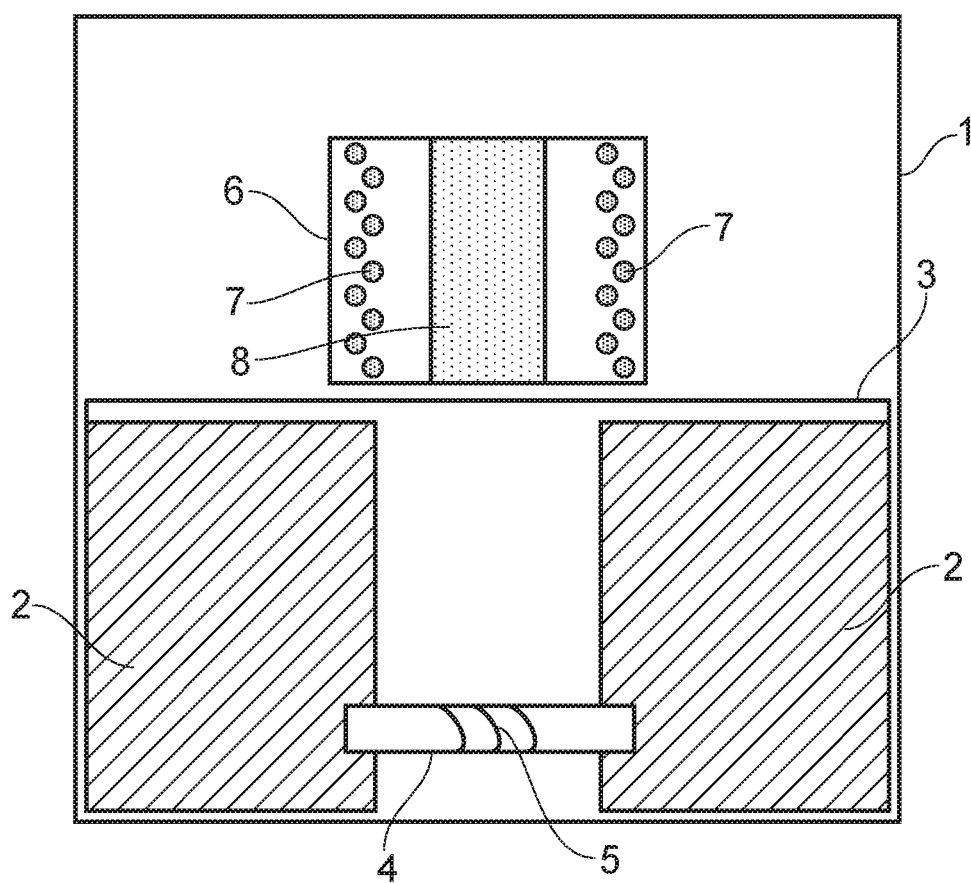
FIG. 3 is a highly schematic cross-section of a cartomizer 1 in accordance with certain embodiments of the disclosure.

It will be appreciated by the person skilled in the art that FIGS. 1 to 3 are not drawn to scale.

Figure 4:
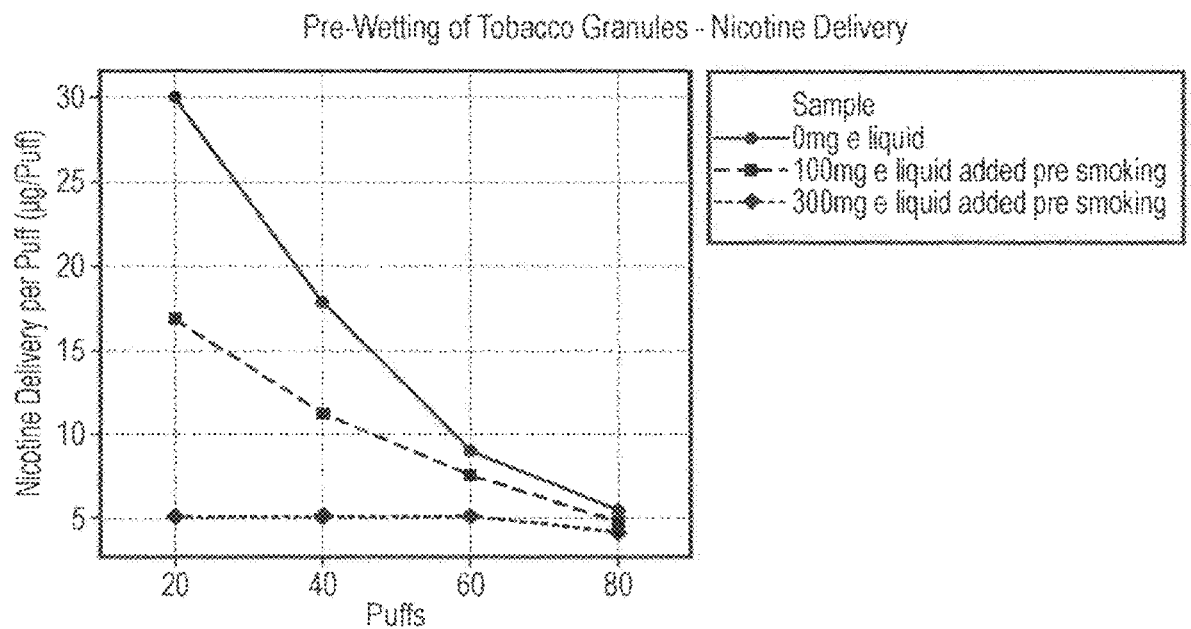

FIG. 4 is a graph showing the effect of pre-wetting on nicotine delivery from tobacco granules, carried out as described in Example 1 below.

Figure 5:
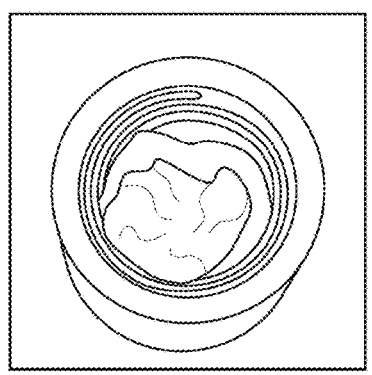

FIG. 5 is a picture of a consumable in accordance with certain embodiments of this disclosure. This consumable was used in Example 2 to prove the hypothesis that including a drying agent in proximity to substrate reduces the amount of aerosol deposits on the substrate. The drying agent in the consumable of FIG. 5 is Japanese Organic Cotton, and it is arranged around the edge of the consumable so that it is in contact with the inner wall or surface thereof and surrounds the substrate.

Figure 6:
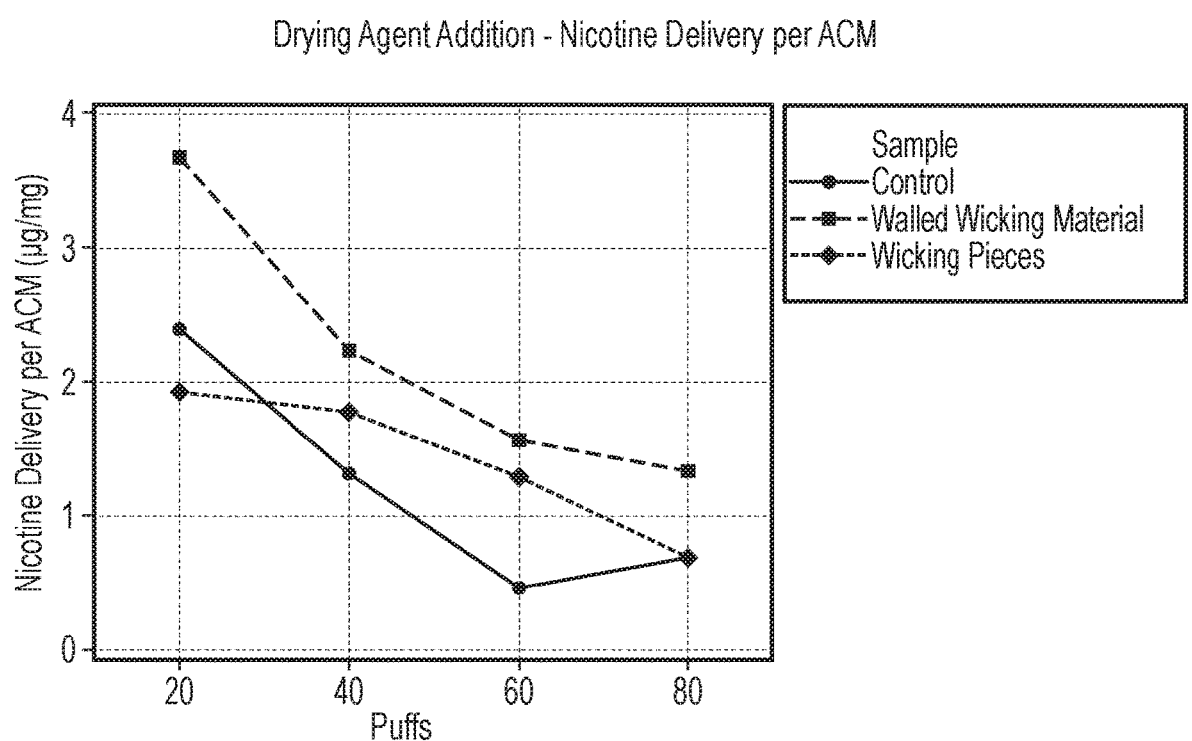

FIG. 6 is a graph showing the effect of using wicking material (Japanese Organic Cotton) as a drying agent, as described in Example 2. FIG. 6 is discussed in more detail in the examples below.

DETAILED DESCRIPTION

Aspects and features of certain examples and embodiments are discussed and described herein. Some aspects and features of certain examples and embodiments may be implemented conventionally and these are not discussed or described in detail in the interests of brevity. It will thus be appreciated that aspects and features of apparatus and methods discussed herein which are not described in detail may be implemented in accordance with any conventional techniques for implementing such aspects and features.

As discussed herein, the present disclosure provides a consumable comprising at least one substrate material in proximity to at least one drying agent, and a pod, a cartomizer and an aerosol provision system, each including the consumable. In arriving at the present disclosure, the inventors recognised that delivery of volatile compound(s) from substrate material(s) typically incorporated into aerosol provision systems, decreases over time in use. In particular, a significant drop in volatile (e.g. nicotine) delivery from a tobacco substrate material was observed by the inventors following prolonged puffing. From carrying out further experiments, which are discussed in more detail below, the inventors recognised that volatile compound(s) delivery was being adversely affected by aerosol deposition.

With continued puffing, aerosol is generated and transported through an aerosol provision system for inhalation. As noted above, a flow path is typically established which connects the aerosol generation chamber and an outlet, e.g. an opening in a mouthpiece, so that incoming air drawn through the aerosol generation chamber continues along the flow path, carrying at least some of the aerosol with it and out through the outlet for inhalation by the user. However, when the aerosol contacts a surface within the aerosol provision system, it can deposit liquid thereon. More particularly, when the aerosol provision system includes substrate material, e.g. tobacco or non-tobacco substrate material, and the aerosol contacts the substrate material, deposition of the aerosol can occur on the substrate material.

Without wishing to be bound by any one theory, the inventors believe that when an aerosol provision system includes substrate material, deposition of aerosol onto the surface of the substrate forms a barrier to delivery of volatile compound(s) from the substrate. Due to the presence of aerosol deposits, the volatile compound(s) is(are) unable to be taken up by the aerosol passing through or over the substrate. Volatile compound(s) delivery is not therefore consistent over the use of the aerosol provision system, and there is a desire in the art for aerosol provision systems to be able to provide consistent volatiles delivery.

An additional issue with aerosol deposits is that they can collect' in the aerosol provision system and form excessively large liquid droplets. When such droplets are drawn into the flow path and out of the mouthpiece by the user, they significantly impact the sensory experience of the user. Accordingly there is also a desire in the art for aerosol provision systems which form a reduced level of aerosol deposits during use.

The disclosure provides an advantageous approach to overcoming these deposition issues by incorporating at least one drying agent in the proximity of at least one substrate material in a consumable. The drying agent is able to reduce the level of deposited aerosol and thereby improve user experience and consistency of volatiles delivery. The present disclosure thus reduces the level of aerosol deposition in a consumable, and provides a consumable, pod, cartomizer, and aerosol provision system which can be easily implemented by a user. For ease of reference, these and further features of the present disclosure are now discussed under appropriate section headings. However, the teachings under each section are not limited to the section in which they are found.

Consumable

As noted above, the term "consumable" is used herein to refer to an article, part or all of which is intended to be consumed during use by a user. The present disclosure thus relates to a consumable for an aerosol provision system which comprises at least one substrate material in proximity to at least one drying agent. By the expression "in proximity to" is meant that the substrate material(s) and drying agent(s) are arranged close to one another in the consumable. In one embodiment the substrate material(s) and drying agent(s) are adjacent to one another. In another embodiment the substrate material(s) and drying agent(s) are in at least partial contact with one another.

A "substrate material" is a material which contains a compound to be aerosolised, i.e. a volatile compound. The substrate material can be solid, liquid or gel. In one embodiment the substrate material in the present disclosure is solid or gel. In one embodiment the substrate material is solid.

The substrate material may include at least one "flavor", "flavoring agent" or "flavorant". The terms "flavor", "flavoring agent" and "flavorant" are used interchangeably to refer to materials which, where local regulations permit, are added to a material to create a desired taste, aroma or other somatosensorial sensation in a product for adult consumers. Reference here to "flavor", "flavoring agent" or "flavorant" include both singular and multi-component flavors. They may include naturally occurring flavor materials, botanicals, extracts of botanicals, synthetically obtained materials, or combinations thereof.

The flavor, flavoring agent or flavorant may be selected from the group consisting of extracts, for example liquorice, *hydrangea*, Japanese white bark *magnolia* leaf, tobacco, *cannabis*, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, *cassia*, caraway, cognac, jasmine, ylang-ylang, sage, fennel, pimento, ginger, anise, coriander, coffee, flavor enhancers, bitterness receptor site blockers, sensorial receptor site activators or stimulators, sugars or sugar substitutes (e.g. sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In some embodiments, the flavor comprises menthol, spearmint or peppermint. In some embodiments, the flavor comprises flavor components of cucumber, blueberry, citrus fruits or redberry. In some embodiments, the flavor comprises eugenol. In some embodiments, the flavor comprises flavor components extracted from tobacco. In some embodiments, the flavor comprises flavor components extracted from *cannabis*.

In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The substrate material may also comprise other components. Such other components may be conventional in the sense that they are typically included in substrate materials for e-cigarettes or vaping devices. In one embodiment the substrate material further comprises an active agent. By the term "active agent" is meant any agent which has a biological effect on a subject when the vapour is inhaled. The active agent or substance may be a physiologically active material, which is a material intended to achieve or enhance a physiological response. The active substance may for example be selected from nutraceuticals, nootropics, psychoactives. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, *cannabis* or another botanical.

The one or more active agents may be selected from nicotine, botanicals, and mixtures thereof. The one or more active agents may be of synthetic or natural origin. The active could be an extract from a botanical, such as from a plant in the tobacco family. An example active is nicotine. In some embodiments the active substance comprises caffeine, melatonin or vitamin B12.

In one embodiment the substrate material comprises nicotine. Nicotine may be provided in any suitable amount depending on the desired dosage when inhaled by the user. In one embodiment nicotine is present in an amount of no greater than about 6 wt % based on the total weight of the substrate material. By the expression "total weight of the substrate material" is meant the total weight of the substrate material in which the nicotine is present.

In one embodiment nicotine is present in an amount of from about 0.4 to about 6 wt % based on the total weight of the substrate material. In one embodiment nicotine is present in an amount of from about 0.8 to about 6 wt % based on the total weight of the substrate material. In one embodiment nicotine is present in an amount of from about 1 to about 6 wt % based on the total weight of the substrate material. In one embodiment nicotine is present in an amount of from about 1.8 to about 6 wt % based on the total weight of the substrate material.

In another embodiment nicotine is present in an amount of no greater than about 3 wt % based on the total weight of the substrate material. In one embodiment nicotine is present in an amount of from about 0.4 to about 3 wt % based on the total weight of the substrate material. In one embodiment nicotine is present in an amount of from about 0.8 to about 3 wt % based on the total weight of the substrate material. In one embodiment nicotine is present in an amount of from about 1 to about 3 wt % based on the total weight of the substrate material. In one embodiment nicotine is present in an amount of from about 1.8 to about 3 wt % based on the total weight of the substrate material.

In one embodiment nicotine is present in an amount of less than about 1.9 wt % based on the total weight of the substrate material. In one embodiment nicotine is present in an amount of less than about 1.8 wt % based on the total weight of the substrate material. In one embodiment nicotine is present in an amount of from about 0.4 to less than about 1.9 wt % based on the total weight of the substrate material. In one embodiment nicotine is present in an amount of from about 0.4 to less than about 1.8 wt % based on the total weight of the substrate material. In one embodiment nicotine is present in an amount of from about 0.5 to less than about 1.9 wt % based on the total weight of the substrate material. In one embodiment nicotine is present in an amount of from about 0.5 to less than about 1.8 wt % based on the total weight of the substrate material. In one embodiment nicotine is present in an amount of from about 0.8 to less than about 1.9 wt % based on the total weight of the substrate material. In one embodiment nicotine is present in an amount of from about 0.8 to less than about 1.8 wt % based on the total weight of the substrate material. In one embodiment nicotine is present in an amount of from about 1 to less than about 1.9 wt % based on the total weight of the substrate material. In one embodiment nicotine is present in an amount of from about 1 to less than about 1.8 wt % based on the total weight of the substrate material.

In one embodiment the substrate material does not contain nicotine.

As noted herein, the active substance may comprise or be derived from one or more botanicals or constituents, derivatives or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, *eucalyptus*, star anise, hemp, cocoa, *cannabis*, fennel, lemongrass, peppermint, spearmint, rooibos, chamomile, flax, ginger, *Ginkgo biloba*, hazel, hibiscus, laurel, licorice (liquorice), matcha, mate, orange skin, *papaya*, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, *curcuma*, turmeric, sandalwood, cilantro, bergamot, orange blossom, myrtle, cassis, valerian, pimento, mace, damien, marjoram, olive, lemon balm, lemon basil, chive, *carvi, verbena*, tarragon, geranium, mulberry, *ginseng*, theanine, theacrine, maca, ashwagandha, damiana, guarana, chlorophyll, baobab or any combination thereof. The mint may be chosen from the following mint varieties: *Mentha Arventis, Mentha* c.v.*, Mentha niliaca, Mentha piperita, Mentha piperita citrata* c.v.*, Mentha piperita* c.v*, Mentha spicata crispa, Mentha cardifolia, Memtha longifolia, Mentha suaveolens variegata, Mentha pulegium, Mentha spicata* c.v. and *Mentha suaveolens*

In some embodiments, the active substance comprises or is derived from one or more botanicals or constituents, derivatives or extracts thereof and the botanical is tobacco.

In some embodiments, the active substance comprises or derived from one or more botanicals or constituents, derivatives or extracts thereof and the botanical is selected from *eucalyptus*, star anise, cocoa and hemp.

In some embodiments, the active substance comprises or derived from one or more botanicals or constituents, derivatives or extracts thereof and the botanical is selected from rooibos and fennel.

In one embodiment, the substrate material may contain one or acids. In one embodiment, the substrate material may contain one or more acids in addition to nicotine (as the active agent).

In one embodiment, the one or more acids may be one or more organic acids, e.g. one or more organic acids selected from the group consisting of benzoic acid, levulinic acid, malic acid, maleic acid, fumaric acid, citric acid, lactic acid, acetic acid, succinic acid, and mixtures thereof. When included in the substrate material in combination with nicotine, the one or more acids may provide a formulation in which the nicotine is at least partially in protonated (such as monoprotonated or diprotonated) form.

The nicotine present in the substrate material may be added or may be inherently present if the substrate material is a tobacco substrate material. In one embodiment the substrate material includes at least one tobacco substrate material. The tobacco substrate material may be solid, liquid or gel. In one embodiment the tobacco substrate material is solid. The identity of the tobacco is not limited; it can be any type or grade of tobacco and includes any part, such as for example, the leaves or stems of any member of the genus *Nicotiana* and reconstituted materials thereof. In one embodiment, the tobacco is from the species *Nicotiana tabacum*.

The tobacco substrate material may be from one variety of tobacco or from more than one variety of tobacco. As is known in the art, the latter can be referred to as a blend. Examples of tobacco varieties which may be used include, but are not limited to, Virginia, Burley, Oriental and Rustica tobaccos.

In one embodiment the tobacco substrate material is a pH-treated tobacco material; pH treatment of tobacco is well-known in the art. In general, pH treatment raises the pH of the tobacco material from an acidic pH to an alkaline pH.

The tobacco substrate material, including when the tobacco substrate material is a pH-treated tobacco material, can be in any suitable form. In one embodiment the tobacco substrate material is in the form of particles, beads, granules or the like. The shape or size of such particles, beads or granules is not limited in the context of the present disclosure. The skilled person will be aware of suitable sizes and shapes and the methods by which such sizes and shapes can be achieved.

In another embodiment the substrate material includes a non-tobacco substrate material.

Along with the substrate material and drying agent, the consumable may comprise one or more other elements, such as a filter or an aerosol modifying substance or agent. The disclosure is not limited in this respect. An aerosol-modifying agent is a substance, typically located downstream of the aerosol generation area, that is configured to modify the aerosol generated, for example by changing the taste, flavor, acidity or another characteristic of the aerosol. The aerosol-modifying agent may be provided in an aerosol-modifying agent release component that is operable to selectively release the aerosol-modifying agent.

The aerosol-modifying agent may, for example, be an additive or an additional sorbent. The aerosol-modifying agent may, for example, comprise one or more of a flavorant, a colorant, water, and a carbon adsorbent. The aerosol-modifying agent may, for example, be a solid, a liquid, or a gel. The aerosol-modifying agent may be in powder, thread or granule form. The aerosol-modifying agent may be free from filtration material.

By the term "drying agent" is meant a chemical compound or other material which removes liquid or moisture from another compound or material or the immediate environment. A drying agent typically retains the liquid or moisture so removed. Such retention can be permanent or temporary; the drying agent may for instance act as a temporary store of the removed liquid or moisture, the removed liquid or moisture being subsequently drained off by a further mechanism known in the art, e.g. via capillary action. Alternatively the drying agent may permanently retain the moisture or liquid so removed, at least until the drying agent reaches a state of maximum saturation. At this point the drying agent or the consumable should be replaced.

The drying agent(s) may be a sorbent. Sorbents are well-known in the art and include porous materials such as sponges, a polypropylene fibre product, a cellulose fibre product, desiccants, wicking material, and the like.

In one embodiment the sorbent is a desiccant, a wicking material, or a mixture thereof. In one embodiment the sorbent is a wicking material or a mixture thereof. In another embodiment the sorbent is a desiccant or mixture thereof. As is known in the art, a desiccant is a hygroscopic substance that induces or sustains a state of dryness in its vicinity. Commonly encountered desiccants are solids that absorb water such as activated charcoal, calcium sulfate, calcium chloride, superabsorbent polymers and molecular sieves (typically zeolites). The skilled person will be aware of other compounds or materials which can be classed as a desiccant. Each may be used as a drying agent in the present disclosure.

In one embodiment the desiccant is selected from the group consisting of anhydrous inorganic salts, superabsorbent polymers, silica, zeolites, activated charcoal, or mixtures thereof. In another embodiment the desiccant is selected from the group consisting of anhydrous inorganic salts, superabsorbent polymers, silica or a mixture thereof. The anhydrous inorganic salt may be anhydrous calcium chloride, anhydrous sodium sulfate, anhydrous calcium sulfate, anhydrous magnesium sulfate or a mixture of any two or more thereof.

As is known in the art, superabsorbent polymers can absorb and retain extremely large amounts of liquid relative to their own mass. They may also be referred to as "slush powders" and classified as hydrogels when cross-linked. The most common type of superabsorbent polymer is sodium polyacrylate, but the present disclosure also contemplates the use of other known superabsorbent polymers such as polyacrylamide copolymer, ethylene maleic anhydride copolymer, cross-linked carboxymethylcellulose, polyvinyl alcohol copolymers, cross-linked polyethylene oxide and starch-grafted copolymer of polyacrylonitrile. Suitable superabsorbent polymers are commercially available or may be prepared according to methods known in the art such as gel polymerisation, suspension polymerisation or solution polymerisation. Gel polymerisation is typically used to prepare sodium polyacrylate.

In one embodiment the desiccant is selected from the group consisting of silica, sodium polyacrylate, anhydrous calcium chloride, anhydrous sodium sulfate, anhydrous calcium sulfate, anhydrous magnesium sulfate, and mixtures thereof.

By the term "wicking material" is meant a material or fabric which draws moisture or liquid away from another component or material. In one embodiment the wicking material is a fabric used in electronic cigarettes to draw liquid away from the reservoir and onto the heating element. Suitable wicking materials or fabrics can include glass fibres and cotton. In one embodiment the wicking material is a cotton, e.g. an organic cotton, or glass fibres. The skilled person will be aware of the materials which are used in electronic cigarettes as wicking fabrics, and thus able to provide a wicking material for use in the present disclosure. For example, Japanese Organic Cotton can be used.

FIGS. 1, 2 and 3 are schematic cross-sectional and perspective views of example cartomizers. Each FIG. includes a consumable 6 according to some embodiments of the present disclosure, which includes substrate material 7 and drying agent 8. In the example of FIG. 1, the drying agent and substrate material are independent of one another (i.e. they are distinguishable materials), and in the form of a mixture. The mixture may be homogeneous or heterogeneous. In the example of FIG. 2, the drying agent 8 is arranged to be at least partially in contact with a surface of the consumable, specifically the inner surface of the wall of the consumable, and adjacent to the substrate material 7. For example, the drying agent may form a layer around the edge or periphery of the consumable, and the substrate material may be arranged towards the centre of the consumable. With this arrangement, the drying agent effectively surrounds the substrate material. In one embodiment, the drying agent forms at least a partial layer on the inner wall of the consumable and the substrate material is arranged approximately towards the centre of the consumable. In one embodiment, the drying agent is arranged to at least partially surround the substrate material in the consumable. The example cartomizer shown in FIG. 3 is identical to FIG. 2, except that the positions of the drying agent and substrate material have been interchanged. The substrate material 7 is arranged to be at least partially in contact with a surface of the consumable, specifically the inner surface of the wall of the consumable, and adjacent to the drying agent 8. The substrate material may form a layer around the edge or periphery of the consumable, and the drying agent may be arranged approximately towards the centre of the consumable. With this arrangement, the substrate material effectively surrounds the drying agent in the consumable. In one embodiment, the substrate material forms at least a partial layer on the inner wall of the consumable and the drying agent is arranged approximately towards the centre of the consumable, e.g. in the form of a central pillar or other suitable shape. In one embodiment, the substrate material is arranged to at least partially surround the drying agent in the consumable.

The skilled person will appreciate that the present disclosure is not limited to the specific arrangements shown in FIGS. 1, 2 and 3. These FIGS. are just provided by way of example. The drying agent(s) and substrate material(s) may for instance be contained in the same particulate form. By "contained in the same particulate form" is meant that the drying agent(s) and substrate material(s) are processed together into a form that has a reduced particle size from the starting material, e.g. particles/beads/granules or the like. Such particles, beads or granules may, for example, be formed by extruding the drying agent(s) and substrate material(s) together, or by subjecting the drying agent(s) and substrate material(s) to any other known method which reduces the particle size such as chopping milling, grinding or the like in order to form particles the majority of which contain drying agent(s) and substrate material(s).

Pod

The present disclosure also relates to a pod for an aerosol provision system containing the consumable as defined herein, where the consumable is configured to receive an aerosol.

By the term "pod" is meant an insert which can be placed into an open end of an aerosol provision system, typically downstream of a cartomizer. In one embodiment, the pod is or forms part of a mouthpiece which can be placed into an outlet of an aerosol provision system. The pod may be a tobacco pod in the sense that the substrate material includes at least one tobacco substrate material as defined above. Alternatively the pod may be a flavor pod in the sense that the substrate material does not include tobacco and instead includes one or more flavors or flavoring agents as defined herein.

Cartomizer

The present disclosure also relates to a cartomizer for generating aerosol upstream of the consumable as defined herein, or the pod as defined herein. As is known in the art, cartomizers may also be referred to as cartridges. Throughout the following description, the term "cartridge" may therefore be used interchangeably with "cartomizer".

In one embodiment the cartomizer comprises an aerosol generation chamber containing at least one aerosol precursor material and at least one component for generating aerosol from the at least one aerosol precursor material, wherein the aerosol generation chamber and the consumable or the pod are arranged in fluid communication so that when the cartomizer is comprised in an aerosol provision system and suction is applied by a user to an outlet of the aerosol provision system, an aerosol flow path is established from the aerosol generation chamber, via the consumable or the pod, to the outlet, wherein the aerosol generation chamber does not include a drying agent.

The component for generating aerosol may be a heating element that emits heat to cause the aerosol precursor material to generate aerosol in use. The heating element may, for example, comprise combustible material, or may comprise heating material that is heatable by penetration with a varying magnetic field. An example of such a material is discussed further below.

Aerosol precursor material is material that is capable of generating aerosol, for example when heated, irradiated or energized in any other way. Aerosol precursor material may, for example, be in the form of a solid, liquid or gel which may or may not contain an active substance (e.g. nicotine) or flavorants. The flavorants are defined above along with active substances, and the possible nicotine contents. Aerosol precursor material may be used interchangeably with the terms "aerosol generating material", "vapour generating material", "aerosolizable material" or "vapour precursor material".

In some embodiments, the aerosol precursor material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol precursor material may for example comprise from about 50 wt %, 60 wt % or 70 wt % of amorphous solid, to about 90 wt %, 95 wt % or 100 wt % of amorphous solid.

The aerosol precursor material may comprise one or more active substances or flavors, one or more aerosol- or vapour generating agents, and optionally one or more other functional material. The one or more other functional materials may comprise one or more of pH regulators, coloring agents, preservatives, binders, fillers, stabilizers, or antioxidants.

In some embodiments the aerosol precursor material may comprise a vapour- or aerosol-generating agent or a humectant. Example such agents are glycerine, glycerol, propylene glycol, diethylene glycol, triethylene glycol, tetraethylene glycol, 1,3-butylene glycol, erythritol, meso-erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, propylene carbonate, and mixtures thereof. In some embodiments, the aerosol-generating agent may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The aerosol-precursor material may be present on or in a support. The support may, for example, be or comprise paper, card, paperboard, cardboard, reconstituted material, a plastics material, a ceramic material, a composite material, glass, a metal, or a metal alloy. In some embodiments, the support comprises a susceptor. In some embodiments, the susceptor is embedded within the material. In some alternative embodiments, the susceptor is on one or either side of the material. A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. The device that is configured to generate the varying magnetic field is referred to as a magnetic field generator, herein.

FIGS. 1, 2 and 3 are schematic cross-sectional and perspective views of example cartomizers according to some embodiments of the present disclosure. The cartomizer shown in these FIGS. includes a housing, which may be formed of a plastics material. The housing supports other components of the cartomizer and also provides a mechanical interface (not shown) for connecting the cartomizer with a control unit of an aerosol provision system as required. The manner by which the cartomizer connects to the control unit is not significant for the disclosure described herein. It may, for example, comprise a screw thread fitting or any other attachment or connection means known to the person skilled in the art. The shape of the cartomizer housing is not limited and may be any shape known in the art.

The cartomizer includes an aerosol generation chamber 3 comprising at least one aerosol precursor material 2, and at least one component 4,5 for generating aerosol from the at least one aerosol precursor material. The aerosol generation chamber does not include a drying agent. In FIGS. 1-3, the aerosol precursor material 2 is contained in a reservoir or other cavity which comprises the majority of the interior volume of the aerosol generation chamber. Although not significant for the present disclosure, the reservoir or other cavity may generally conform to the interior of the aerosol generation chamber.

In some examples, at least an outer wall of the reservoir may be integrally moulded with the aerosol generation chamber. In other examples, the reservoir may be a component which is formed separately from, but supported in position by, the aerosol generation chamber. In examples, the reservoir may have a tapered circular cross-section but have a flat face running longitudinally along one side to create a space between an outer wall of the reservoir and an inner wall of the aerosol generation chamber to define a flow path through the cartomizer through which aerosol generated in the cartomizer is drawn during use towards an opening or outlet in the end of the cartomizer. In other examples, the reservoir may have an annular shape, with the outer annular surface defined by the aerosol generation chamber, and the inner annular surface defining a flow path. It will be appreciated that there are many configurations which allow for the provision of a liquid reservoir alongside a flow path within the cartomizer. The reservoir may be formed in accordance with conventional techniques, for example comprising a moulded plastics material.

In the example cartomizer of FIGS. 1, 2 and 3, the component for generating aerosol from the at least one aerosol precursor material 2 is a wick 4 and a heater 5. Other known components may, however, be used. The wick and heater are arranged in a space within the aerosol generation chamber. In this example the wick extends transversely across the chamber 3 with its ends extending into the reservoir of aerosol precursor material 2, through openings in the inner wall of the reservoir. The openings in the inner wall of the reservoir are sized to broadly match the dimensions of the wick to provide a reasonable seal against leakage from the liquid reservoir into the cartridge air path without unduly compressing the wick, which may be detrimental to its fluid transfer performance. Aerosol precursor material, e.g. liquid, may infiltrate the wick 4 through surface tension or capillary action.

In other examples the reservoir may comprise a porous ceramic disc (not shown) such that the aerosol precursor material, e.g. liquid, within the reservoir may seep through the ceramic disc. Adjacent the ceramic disc is then the wick into which the liquid may infiltrate.

The heater 5 in FIGS. 1, 2 and 3 comprises an electrically resistive wire coiled around the wick 4 so that electrical power may be supplied to the heater 5 to vaporise an amount of aerosol precursor material drawn to the vicinity of the heater 5 by the wick 4. The heater 5 may comprise a nickel chrome alloy (Cr20Ni80) wire and the wick 4 may comprise a glass fibre bundle, but it will be appreciated that their specific configuration is not significant to the disclosure herein. The rate at which aerosol precursor material is vaporised depends on the amount of power supplied to the heater 5. Accordingly, the rate of aerosol generation can be controlled by adjusting the power supplied to the heater 5, for example through pulse width or frequency modulation techniques.

In FIG. 1, FIG. 2 and FIG. 3, the cartomizer includes a single wick 4 and heater 5 for generating aerosol from the aerosol precursor material 2. In some embodiments the cartomizer includes more than one component for generating aerosol, for example, if more than one aerosol precursor material is present, the cartomizer can include an aerosol-generating component, e.g. a vaporiser, for each precursor material. In other embodiments the cartomizer includes a single component for generating aerosol, as shown in FIG. 1, FIG. 2 and FIG. 3.

As described above, the cartomizer of FIGS. 1-3 also includes a consumable 6 according to certain embodiments of this disclosure. Although not shown in the FIGS., the cartomizer may instead or additionally include a pod according to certain embodiments of this disclosure.

It can be seen from the FIGS. that the aerosol generation chamber and the consumable (or pod) may be arranged in the cartomizer in fluid communication. By the term "fluid communication" is meant that the aerosol generation chamber and consumable (or pod) are arranged in a flow path of aerosol generated from the aerosol precursor material, such that aerosol flows from the aerosol generation chamber, via the consumable or pod (either directly or indirectly), to the outlet for inhalation by the user. In other words, the aerosol which is generated when the cartomizer is comprised in an aerosol provision system, and suction is applied by a user to an outlet of the system, flows from the aerosol generation chamber, via the consumable or pod to the user.

In this manner, aerosol generated by the cartomizer can combine with volatiles from the consumable or pod, e.g. nicotine or flavoring agent(s), and deliver a particular flavor to a user. The drying agent(s) in the consumable or pod advantageously improves the consistency or yield of volatiles delivery or reduces the level of aerosol condensates inhaled by the user.

The aerosol generation chamber and the consumable may be arranged so that they are above one another, as shown in FIGS. 1-3, or they may have an alternative spatial relationship within the cartomizer which means that they are arranged in the flow path of aerosol generated from the aerosol precursor material. An example flow path is shown by an arrow in FIGS. 1-3. The skilled person will, however, be aware of other suitable arrangements which allow the aerosol generation chamber and consumable or pod to be in fluid communication.

Whilst FIGS. 1-3 are shown with an aerosol generation chamber and a consumable, the cartomizer of the present disclosure is not limited to this arrangement. The cartomizer may, for instance, comprise one or more further chambers with a drying agent or at least one substrate material. In one embodiment the cartomizer comprises a further chamber, in fluid communication with the aerosol generation chamber and consumable so that the aerosol flow path passes through the further chamber before reaching an outlet (e.g. mouthpiece) of the aerosol provision system, where the further chamber includes at least one substrate material. In one embodiment the further chamber further comprises at least one drying agent. The substrate material and optional drying agent in the further chamber may be identical or different from the substrate material and drying agent in the consumable, and may be as defined herein.

Aerosol Provision System

The present disclosure also relates to an aerosol provision system comprising the consumable as described herein or the pod as described herein. Also provided is an aerosol provision system comprising the cartomizer as described herein.

As is common in the art, the terms "vapour" and "aerosol", and related terms such as "vaporise", "volatilise" and "aerosolise", may be used interchangeably. Aerosol provision systems/devices may therefore be referred to herein as "vapour provision systems/devices", "aerosol delivery devices/systems", "electronic vapour provision devices/systems", "electronic aerosol provision devices/systems", or "e-cigarettes/electronic cigarettes". These terms may be used interchangeably and are intended to refer to non-combustible aerosol provision systems/devices such as a heating device that releases compounds from aerosolizable material(s) without burning the aerosolizable materials.

The non-combustible aerosol provision system can include electronic cigarettes or e-cigarettes that create aerosol from aerosol precursor materials by heating or other techniques such as vibration; and hybrid systems that provide aerosol via a combination of aerosol precursor materials and solid substrate materials, for example hybrid systems containing liquid or gel precursor materials and a solid substrate material.

In some embodiments, the aerosol provision system is a non-combustible aerosol provision system, such as a powered non-combustible aerosol provision system.

In one embodiment the aerosol provision system is an electronic non-combustible aerosol provision system. In one embodiment, the non-combustible aerosol provision system is an electronic cigarette, also known as a vaping device or electronic nicotine delivery system (END) although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In one embodiment, the non-combustible aerosol provision system is a hybrid system for providing aerosol using a combination of aerosolizable or aerosol-generating materials, one or a plurality of which may be heated. Each of the aerosol-generating materials may be, for example, in the form of a solid, liquid, or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

In some embodiments, the non-combustible aerosol provision system may comprise a power source and a controller or control unit. The power source may, for example, be an electric power source or an exothermic power source. In some embodiments, the exothermic power source comprises a carbon substrate which may be energised so as to distribute power in the form of heat to an aerosol-generating material or to a heat transfer material in proximity to the exothermic power source.

The aerosol provision system can comprise a cartomizer of the present disclosure and generally a control unit as described below. Alternatively the aerosol provision system can comprise a cartomizer not according to the present disclosure (e.g. a cartomizer known in the art), a pod or consumable according to the present disclosure, and generally a control unit as described below. In a further alternative, the aerosol provision system comprises a cartomizer of the present disclosure, a pod or consumable of the present disclosure, and generally a control unit as described below. When including a pod or consumable of the present disclosure, the electronic cigarette may include the pod in a mouthpiece.

The control unit of the aerosol provision system may generally comprise an outer housing, an electrical power source (e.g. a battery), control circuitry for controlling and monitoring the operation of the aerosol provision system, a user input button, and optionally a mouthpiece (which may be detachable). The battery may be rechargeable and be of a conventional type, for example of the kind typically used in electronic cigarettes and other applications requiring provision of relatively high currents over a relatively short period. Similarly, a user input button (or other aerosol generation function) and control circuitry may be conventional. The outer housing may be formed, for example, from a plastics or metallic material. Other suitable materials are known in the art. As will be appreciated, the aerosol provision system will in general comprise various other elements associated with its operating functionality. For example, a port for charging the battery, such as a USB port or the like, and these other elements may be conventional.

When a user sucks/inhales on the aerosol provision system of the present disclosure, air should be drawn from the environment into the system and at least a portion of this air enters a cartomizer. Typically, the incoming air flows past an aerosol generation component (e.g. heater) while the heater is receiving electrical power from the battery in the control unit so as to generate aerosol from an aerosol precursor material. The aerosolised material is then incorporated/entrained into the airflow and drawn through and out of the cartomizer, via the consumable or pod of the present disclosure, for inhalation by a user. FIGS. 1, 2 and 3 include an arrow to indicate the general direction of airflow for certain embodiments of the cartomizer described herein. The airflow may be from the aerosol generation chamber towards the consumable where it contacts the drying agent and substrate material.

The aerosol may be produced or released in various ways depending on the nature of the device, system or product. These include heating to cause evaporation, heating to release compounds, and vibration of a liquid or gel to create droplets.

During normal use, the control circuitry may be configured to monitor various operational aspects of the aerosol provision system. For example, the control circuitry may be configured to monitor a level of power remaining in the rechargeable battery, and this may be performed in accordance with conventional techniques. Additionally the control circuitry may be configured to estimate a remaining amount of aerosol precursor material in the cartomizer, or substrate material in the consumable, for example based on an accumulated time of usage since a new cartomizer or consumable was installed, or based on sensing the levels in the cartomizer or consumable. This may be performed in accordance with any conventional technique(s). It may, for example, be based on sensing the number of puffs on the aerosol provision system in accordance with any conventional technique(s).

If it is determined through monitoring the operational aspects of the aerosol provision system that a certain operating condition has arisen, for example, a cartomizer or consumable or pod is approaching depletion, or a battery level is falling below a predetermined threshold (which may be predefined or user set), the aerosol provision system may be configured to provide a user notification according to any conventional technique(s). Although described with reference to the control circuitry, other user notifications are known in the art and may be implemented in the aerosol provision system of the present disclosure. In addition, it will be appreciated that there are many other situations in which a user notification might be desired, the present disclosure is not limited to providing notification of low levels of liquid or substrate material or remaining battery power.

Volatiles Delivery

The present disclosure relates to the use of a drying agent to increase consistency or yield of volatile compound delivery from a substrate material in an aerosol provision system. In one embodiment the aerosol provision system comprises the consumable as defined herein or the pod as defined herein. The term "volatile compound" is used interchangeably herein with "volatiles", and is meant any compound which evaporates at ambient temperature, e.g. a compound which moves into a gaseous state at ambient temperature. By the term "ambient temperature" is meant between about 20 and 25° C., e.g. about 20° C. The skilled person will be aware of the compounds which are volatile at ambient temperature; they may, for example, be in the form of a flavorant as defined herein or an active substance as defined herein. In one embodiment the volatile compound is nicotine, but the disclosure is not limited to nicotine.

Additionally the present disclosure relates to a method of operating an aerosol provision system configured to increase consistency or yield of volatile compound delivery from a substrate material, the method comprising generating an aerosol from at least one aerosol precursor material, and passing the aerosol through a consumable containing at least one substrate material in proximity to at least one drying agent, wherein the drying agent(s) and substrate material(s) are independent of one another and in the form of a mixture, or wherein the substrate material(s) and drying agent(s) are contained in the same particulate form, or wherein the drying agent(s) is arranged to at least partially surround the substrate material(s), or wherein the substrate material(s) is arranged to at least partially surround the drying agent(s).

The drying agent, substrate material and aerosol precursor material are as described herein.

By the term "volatile compound delivery" or "volatiles delivery" is meant the volatile compound available for inhalation by a user per puff of the aerosol provision system. By the expression "to increase consistency of volatiles delivery" or "to increase consistency of volatile compound delivery" is therefore meant to achieve approximately the same compound/per puff for all available puffs of the aerosol provision system, e.g. with a target of 100 puffs. By the expression "to increase yield of volatile compound delivery" is meant to increase the total amount of the volatile compound available for inhalation by a user of an aerosol provision system.

Similarly, by the term "nicotine delivery" is meant the nicotine available for inhalation by a user per puff of the aerosol provision system. By the expression "to increase consistency of nicotine delivery" is therefore meant to achieve approximately the same nicotine/per puff for all available puffs of the aerosol provision system, e.g. with a target of 100 puffs. By the expression "to increase yield of nicotine delivery" is meant to increase the total amount of nicotine available for inhalation by a user of an aerosol provision system.

Any increase and hence improvement is relative to an aerosol provision system which does not include the drying agent according to the present disclosure.

EXAMPLES

The disclosure will now be described with reference to the following non-limiting examples.

Example 1

It is hypothesised that aerosol deposits on pH-treated tobacco granules form a liquid barrier preventing the release of freebase nicotine from the tobacco. To test this hypothesis, an experiment was devised to simulate the build-up of deposited aerosol on the granules.

Twelve samples were prepared, each consisting of 380 mg±0.002 g of tobacco substrate in a pod. These samples were then split into 3 equal groups:

(i) a control sample with no e-liquid added (0 Puffs equivalent),
(ii) a group pre-wetted with 100 mg±0.005 g e-liquid (~20 Puff equivalent), and
(iii) a group pre-wetted with 300 mg±0.005 g e-liquid (~60 Puff equivalent).

The process for pre-wetting groups (ii) and (iii) was as follows: the pod was placed onto an analytical balance and unflavored e-liquid of the following composition was pipetted onto the top of the pod: Glycerol 17.1% (w/w), Propylene Glycol 70.9% (w/w), Water 12.0% (w/w), Nicotine 0.0% (w/w). The pod was allowed to settle for 2 minutes to allow e-liquid to form an approximately even coating around the granules. Samples were then puffed onto a 44 mm Cambridge filter pad using a linear smoke simulation engine with a 55 ml puff volume, 3 second puff duration, 30 second puff interval regime and a square puff profile to a total of 80 puffs in blocks of 20 puffs.

Prior to puffing on the smoke simulator and after 80 puffs, the pressure drop of the consumable was measured (mm WG). Prior to puffing on the smoke simulator and at the end of each puff block the increase in mass of the Cambridge filter pad (mg) was recorded, and replaced with a new pad. The pads were extracted using propan-2-ol containing a suitable internal standard. An aliquot of the extract was analysed using a GC-FID to determine the nicotine concentration.

The concentration of nicotine extracted was used to calculate on a per puff basis and a graph produced to display the data. This graph is FIG. 4.

It can be seen from FIG. 4 that there is a relationship between the nicotine delivery over time and the amount of liquid added to the tobacco prior to puffing. In particular, the higher the amount of liquid added to the tobacco prior to puffing, the lower the overall nicotine yield. Example 1 and FIG. 4 thus support the finding that deposition of aerosol on a substrate (e.g. tobacco) inhibits volatiles (e.g. nicotine) delivery.

Example 2

To demonstrate that the inclusion of a drying agent in proximity to a substrate reduces the amount of aerosol deposits on the substrate, the following experiment was undertaken. In particular, Example 2 demonstrates that aerosol deposits are reduced via uptake into the drying agent, thereby preventing the formation of a liquid barrier and increasing yield and consistency of volatile(s) delivery from the substrate.

Three sample groups were produced:

(i) 0.250 g±0.002 g of tobacco substrate with 0.045 g±0.001 g of wicking material in a walled formation as shown in FIG. 5;
(ii) 0.250 g±0.002 g of tobacco substrate with 0.045 g±0.001 g of wicking material arranged in layers amongst the tobacco substrate; and
(iii) 0.250 g±0.002 g of tobacco substrate with 0 g of wicking material.

The tobacco substrate material consisted of pH-treated tobacco granules prepared according to methods known in the art, e.g. the method described in WO2019016535. The wicking material was Japanese Organic Cotton that conforms to Standard 100 by OEKE-TEX, Appendix 4. Sample group (i) had the wicking material arranged around the inner wall of the consumable as shown in FIG. 5. Sample group (ii) had the wicking material arranged in layers amongst the tobacco substrate (not shown). Sample group (iii) had no wicking material and was the control.

Cartomizers were prepared having an unflavored e-liquid (aerosol precursor material) of the following composition: glycerol 17.1% (w/w), propylene glycol 70.9% (w/w), water 12.0% (w/w) and nicotine 0.0% (w/w).

Four replicate samples of each group (i) to (iii) were then used with a cartomizer in an aerosol provision system containing a battery and power control system, and analysed according to CORESTA Recommended Method No. 81 (June 2015). The samples were puffed onto a 44 mm Cambridge filter pad using a linear smoke simulation engine with a 50 ml puff volume, 3 second puff duration, 30 second puff interval regime, and a square puff profile, to a total of 80 puffs in blocks of 20 puffs.

At the beginning and end of each puff block, the draw effort of the device were measured (mm WG) and the weight of the Cambridge filter pad (mg) was recorded. The pad was extracted via addition of 20 ml of extraction solution of the composition 0.002% internal standard, 0.005% ethanol, and 99.99% propan-2-ol. The internal standard had the composition: 25.0 g±0.1 g of n-heptadecane, and approximately 180.5 ml propan-2-ol. Following addition of the extraction solution, the pad was shaken at 160 rpm for 20 minutes. Once extracted a 2 ml aliquot was vialled and analysed using a GC-FID to determine the nicotine concentration. The nicotine concentrations were further normalised by the amount of aerosol collected on the Cambridge filter pad. The results are shown in FIG. 6.

It can be seen from FIG. 6 that the addition of a drying agent significantly increased both the yield and consistency of nicotine delivery. Notably the results showed a positive benefit in terms of nicotine delivery, with samples containing Japanese organic cotton showing higher nicotine yields in later puffs compared with a control containing no cotton.

The various embodiments described herein are presented only to assist in understanding and teaching the claimed features. These embodiments are provided as a representative sample of embodiments only, and are not exhaustive or exclusive. It is to be understood that advantages, embodiments, examples, functions, features, structures, or other aspects described herein are not to be considered limitations on the scope of the disclosure as defined by the claims or limitations on equivalents to the claims, and that other embodiments may be utilised and modifications may be made without departing from the scope of the disclosure. Various embodiments of the disclosure may suitably comprise, consist of, or consist essentially of, appropriate combinations of the disclosed elements, components, features, parts, steps, means etc. other than those specifically described herein. In addition, this disclosure may include other embodiments not presently claimed, but which may be claimed in future.

The invention claimed is:

1. A consumable for an aerosol provision system comprising at least one substrate material comprising nicotine in proximity to at least one drying agent, wherein the at least one drying agent is a wicking material, wherein the at least one drying agent removes liquid from the immediate environment and retains it, and where the at least one drying agent is positioned to draw moisture or liquid away from the at least one substrate material to reduce an amount of deposited aerosol on the at least one substrate material.

2. The consumable of claim 1, wherein the at least one drying agent and the at least one substrate material are independent of one another and in the form of a mixture.

3. The consumable of claim 1, wherein the at least one drying agent and the at least one substrate material are contained in the same particulate form.

4. The consumable of claim 1, wherein the at least one drying agent is arranged to be at least partially in contact with a surface of the consumable, and adjacent to the at least one substrate material.

5. The consumable of claim 4, wherein the at least one drying agent is arranged to at least partially surround the at least one substrate material in the consumable.

6. The consumable of claim 1, wherein the nicotine is in an amount of no greater than about 6 wt % based on the total weight of the substrate material.

7. The consumable of claim 1, wherein the nicotine is in an amount of no greater than about 3 wt % based on the total weight of the at least one substrate material.

8. The consumable of claim 1, wherein the at least one substrate material further comprises one or more acids.

9. The consumable of claim 1, wherein the at least one substrate material comprises at least one tobacco substrate material.

10. The consumable of claim 1, wherein the wicking material comprises at least one of cotton and glass fibres.

11. The consumable of claim 1, wherein the at least one drying agent forms a layer around an edge or periphery of the consumable, and the at least one substrate material is arranged towards a center of the consumable.

12. The consumable of claim 1, wherein the at least one substrate material forms a layer around an edge or periphery of the consumable, and the at least one drying agent is arranged towards the center of the consumable.

13. An aerosol provision system or part thereof comprising a consumable, wherein the consumable comprises at least one substrate material comprising nicotine in proximity to at least one drying agent, wherein the at least one drying agent is a wicking material, wherein the at least one drying agent removes liquid from the immediate environment and retains it, and wherein the at least one drying agent is positioned to draw moisture or liquid away from the at least one substrate material to reduce an amount of deposited aerosol on the at least one substrate material.

14. The aerosol provision system or part thereof according to claim 13, further comprising a pod for an aerosol provision system, wherein the pod contains the consumable, wherein the consumable is configured to receive an aerosol.

15. The aerosol provision system or part thereof according to claim 13, further comprising a cartomizer for generating aerosol upstream of the consumable.

16. The aerosol provision system or part thereof according to claim 15, wherein the cartomizer comprises an aerosol generation chamber containing at least one aerosol precursor material and at least one component for generating aerosol from the at least one aerosol precursor material; wherein the aerosol generation chamber and the consumable are arranged in fluid communication so that when the cartomizer is comprised in an aerosol provision system and suction is applied by a user to an outlet of the aerosol provision system, an aerosol flow path is established from the aerosol generation chamber, via the consumable, to the outlet; wherein the aerosol generation chamber does not include the at least one drying agent.

17. The aerosol provision system of part thereof according to claim 16, wherein the at least one component for generating aerosol from the at least one aerosol precursor material is a wick and a heater, and wherein the wick extends transversely across the aerosol generation chamber with ends extending in a reservoir of aerosol precursor material.

18. The aerosol provision system or part thereof according to claim 17, wherein the heater comprises an electrically resistive wire coiled around the wick.

19. The aerosol provision system or part thereof according to claim 13, comprising:
   a cartomizer comprising the consumable and a heating element;
   a battery and control circuitry configured to operate the cartomizer, wherein the at least one drying agent is configured to increase consistency or yield of volatile compound delivery from the substrate material in the aerosol provision system.

20. A method of operating an aerosol provision system configured to improve consistency or yield of volatile compound delivery from a substrate material, the method comprising:
   generating an aerosol from at least one aerosol precursor material; and
   passing the aerosol through a consumable containing at least one substrate material comprising nicotine in proximity to at least one drying agent, wherein the at least one drying agent is a wicking material,
   wherein at least one of:
      the at least one drying agent and the substrate material are independent of one another and in the form of a mixture;
      the substrate material and the at least one drying agent are contained in the same particulate form;
      the at least one drying agent is arranged to at least partially surround the substrate material; or
      the substrate material is arranged to at least partially surround the at least one drying agent; and
         wherein the at least one drying agent removes liquid from the immediate environment and retains it, and wherein the at least one drying agent is positioned to draw moisture or liquid away from the substrate material to reduce an amount of deposited aerosol on the substrate material.

* * * * *